United States Patent
Sweeney et al.

(10) Patent No.: US 8,053,008 B2
(45) Date of Patent: Nov. 8, 2011

(54) METHOD OF MANUFACTURING FLAVOR POUCHES

(75) Inventors: William R. Sweeney, Richmond, VA (US); Danielle R. Crawford, Chester, VA (US)

(73) Assignee: Philip Morris USA Inc., Richmond, VA (US)

( * ) Notice: Subject to any disclaimer, the term of this patent is extended or adjusted under 35 U.S.C. 154(b) by 1138 days.

(21) Appl. No.: 11/601,640

(22) Filed: Nov. 20, 2006

(65) Prior Publication Data

US 2007/0122526 A1    May 31, 2007

Related U.S. Application Data

(60) Provisional application No. 60/738,051, filed on Nov. 21, 2005.

(51) Int. Cl.
*B65B 29/02* (2006.01)

(52) U.S. Cl. ............ 426/78; 426/77; 426/132; 426/390; 426/416; 131/374; 131/352; 131/359; 53/450

(58) Field of Classification Search ............ 426/77–84; 131/111, 112, 116, 117, 118, 347, 352–359; 53/450

See application file for complete search history.

(56) References Cited

U.S. PATENT DOCUMENTS

| | | | | |
|---|---|---|---|---|
| 2,313,696 A * | 3/1943 | Yates | ............................... | 426/77 |
| 3,607,299 A * | 9/1971 | Bolt | ............................... | 426/394 |
| 3,692,536 A * | 9/1972 | Fant | ............................... | 426/79 |
| 3,757,798 A * | 9/1973 | Lambert | ............................... | 131/270 |
| 3,846,569 A * | 11/1974 | Kaplan | ............................... | 426/394 |
| 4,619,830 A * | 10/1986 | Napier | ............................... | 426/82 |
| 4,703,765 A * | 11/1987 | Paules et al. | ............................... | 131/112 |
| 5,167,244 A | 12/1992 | Kjerstad | | |
| 5,601,716 A * | 2/1997 | Heinrich et al. | ............................... | 210/490 |
| 5,806,408 A | 9/1998 | DeBacker et al. | | |
| 5,927,052 A * | 7/1999 | Nippes et al. | ............................... | 53/445 |
| 6,135,120 A | 10/2000 | Löfman et al. | | |
| 6,162,516 A | 12/2000 | Derr | | |
| 2002/0170567 A1 | 11/2002 | Rizzotto et al. | | |
| 2003/0070687 A1 * | 4/2003 | Atchley et al. | ............................... | 131/352 |
| 2006/0118589 A1 | 6/2006 | Arnarp et al. | | |

FOREIGN PATENT DOCUMENTS

EP    0186502 A    7/1986

(Continued)

OTHER PUBLICATIONS

Brody, A.L., Marsh, K.S., The Wiley Encyclopedia of Packaging Technology, N.Y., J Wiley & Sons, 1997, p. 465-468. TS195. A2W55.*

(Continued)

*Primary Examiner* — Rena Dye
*Assistant Examiner* — Chiam Smith
(74) *Attorney, Agent, or Firm* — Buchanan Ingersoll & Rooney PC

(57) ABSTRACT

A method of manufacturing a flavor pouch containing flavorant selected from one or more of tea, coffee, rose hips, honey, royal jelly, fruit extracts, mint, sweeteners, exotic flavors, and the like includes feeding a strip of fabric along a feed path, placing preselected amounts of flavorant material at spaced apart locations along the strip, forming flavor pouches by sealing portions of the strip together to enclose each preselected amount of flavorant material, and separating the flavor pouches from the strip. The pouches can have various shapes including crescent and oval shapes.

14 Claims, 3 Drawing Sheets

FOREIGN PATENT DOCUMENTS

| | | |
|---|---|---|
| EP | 0 145 499 B1 | 4/1989 |
| EP | 0 422 898 B1 | 9/1994 |
| EP | 0 599 425 B1 | 10/1997 |
| WO | WO 97/45336 | 12/1997 |
| WO | 2005/027815 A1 | 3/2005 |
| WO | 2005/046363 A2 | 5/2005 |
| WO | 2005/077232 A2 | 8/2005 |

OTHER PUBLICATIONS

International Search Report and Written Opinion dated Jul. 5, 2007 for PCT/IB2006/004023.

* cited by examiner

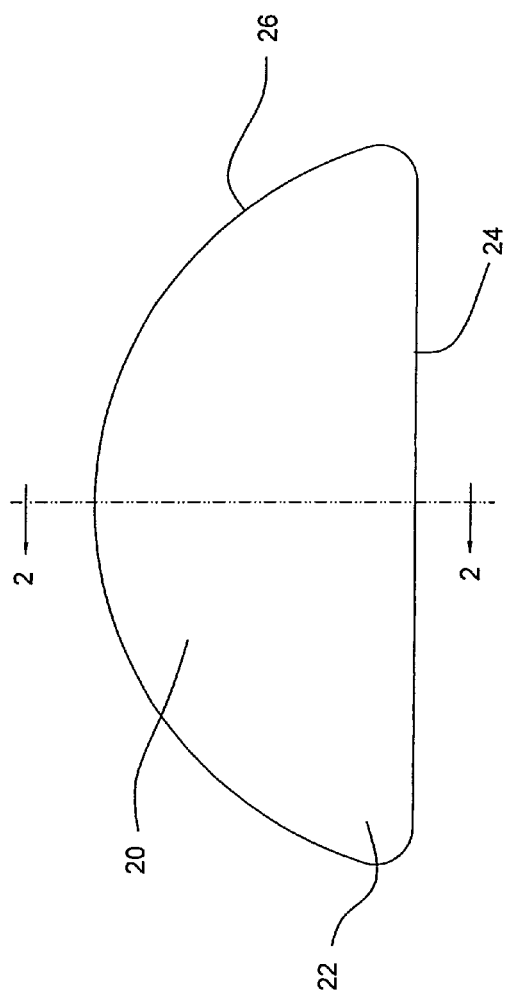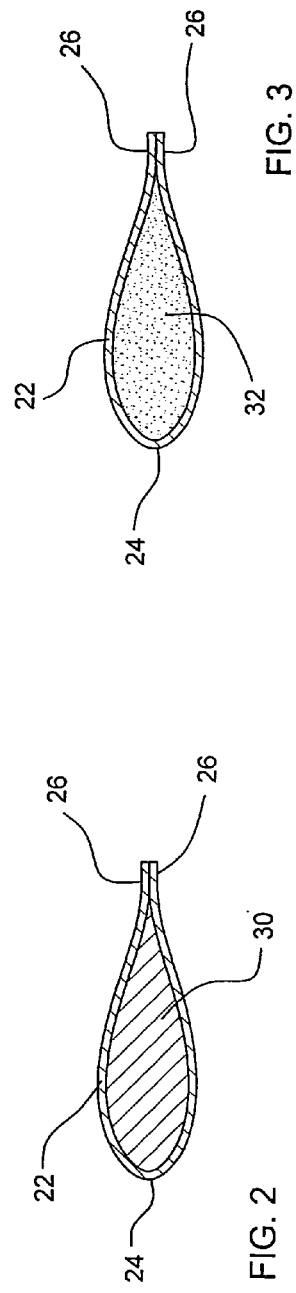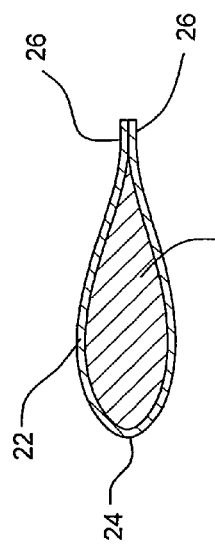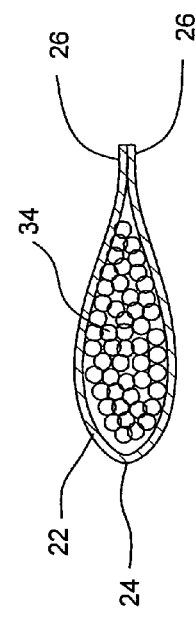

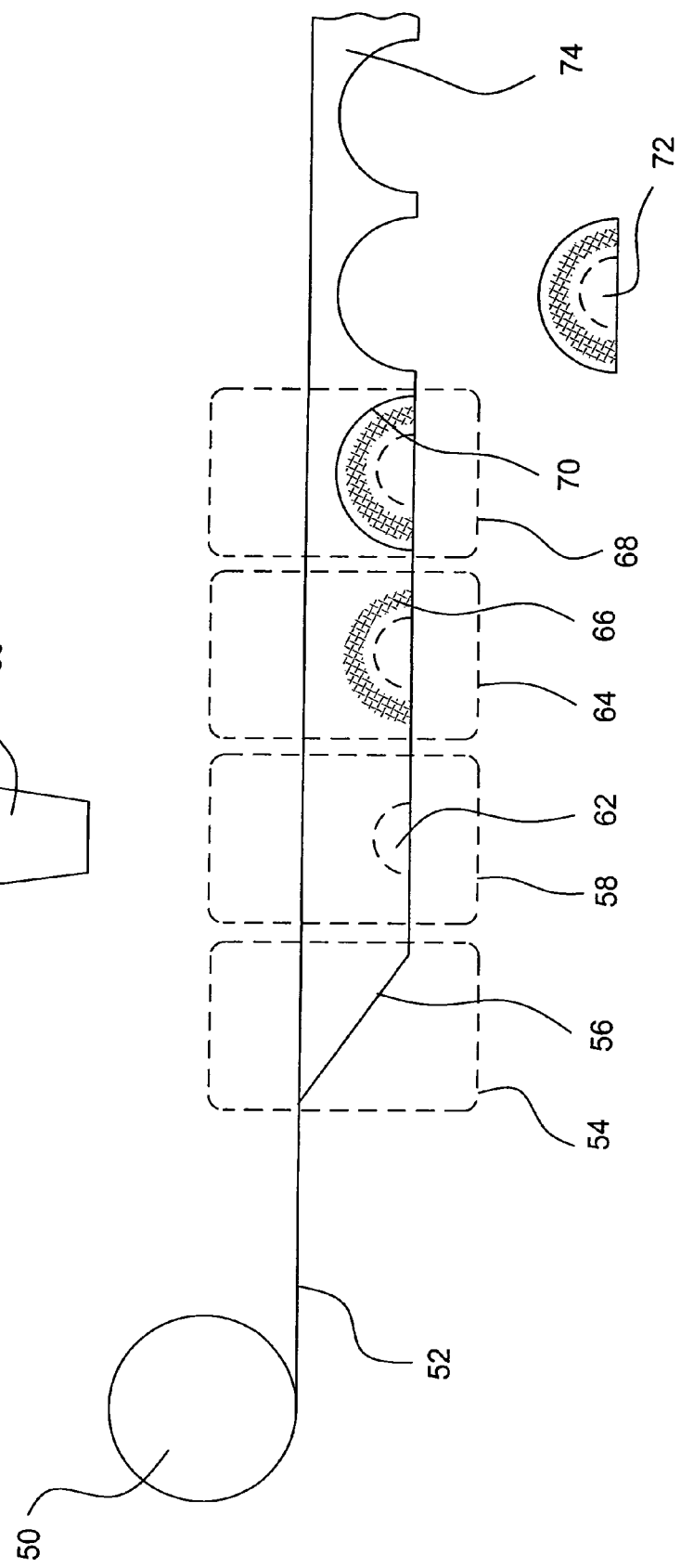

METHOD OF MANUFACTURING FLAVOR POUCHES

RELATED APPLICATIONS

This application claims priority under 35 U.S.C. §119 to U.S. Provisional Application No. 60/738,051 entitled METHOD OF MANUFACTURING FLAVOR POUCHES and filed on Nov. 21, 2005, the entire content of which is hereby incorporated by reference.

FIELD OF THE INVENTION

This disclosure concerns a method for making a flavor pouch for oral delivery of one or more selected flavorants.

SUMMARY

A method of making a flavor pouch comprises the steps of feeding a strip of non-woven polypropylene fabric along a feed path, placing preselected amounts of flavorant material at spaced apart locations along the strip, forming flavor pouches by sealing portions of the strip together to enclose each preselected amount of flavorant material, and separating the flavor pouches from the strip.

Each flavor pouch comprises an external wrapper that encloses a flavor source. Preferably the pouch is sized to comfortably be received in a human mouth. In addition, the pouch may be sized so that it can be moved around inside a human mouth, while not materially interfering with speech or oral breathing.

The external wrapper preferably comprises a membrane that is sufficiently porous to allow transport through the membrane of flavor from the source. While various configurations for the pouch are contemplated, a preferred configuration is generally crescent-shaped. Such a crescent shape facilitates manufacture and reduces the amount of peripheral edge sealing that would otherwise be needed. The external wrapper membrane is preferably resistant to deterioration in the presence of saliva and bacteria.

The flavor source may comprise a strip of material having the desired flavor characteristics. Those flavor characteristics may be natural, synthetic, artificial or combinations thereof. Moreover, those flavor characteristics may be (i) applied to the surface of the strip, (ii) integral with the material of the strip, or (iii) additives in the body of the strip material.

Other flavor sources may be beads, with or without soluble encapsulation. Encapsulation may provide a time-release function so that the flavorant is dispensed over a longer time period than would otherwise occur. Alternatively, the flavor source may also be a solid or a highly viscous fluid. Furthermore, the flavor source may be a matrix, either natural or synthetic, capable of holding flavorant materials or compounds.

Preferred flavorants for use in the pouch include, without limitation, both natural and artificial flavor compounds. Preferred flavors are preferably adult flavors that are neither sweet nor sour. Preferred adult flavors for use are, again without limitation, tea, rose hips, honey, royal jelly, fruit extracts, vitamins, coffee, mint, spices such as ginger, pepper extract, exotic fruits, exotic vegetables, international, and ethnic flavors.

BRIEF DESCRIPTION OF THE DRAWINGS

FIG. 1 is a top view of a flavor pouch.
FIG. 2 is cross-sectional view of the flavor pouch taken along the line 2-2 of FIG. 1.
FIG. 3 is a cross-sectional view of a second embodiment of the flavor pouch of FIG. 1 with a different flavor source.
FIG. 4 is a cross-sectional view of a third embodiment of the flavor pouch of FIG. 1 with still another flavor source.
FIG. 9 is a schematic view of a process for making the flavor pouch.

DETAILED DESCRIPTION

Figure 8:
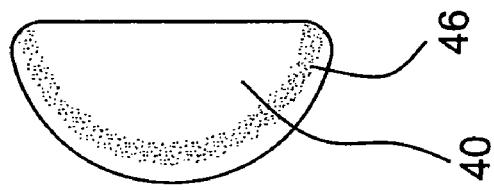
FIG. 8 is a plan view showing the location of a thermal weld.

Turning now to FIG. 1, a flavor pouch 20 is depicted according to one embodiment of this disclosure. Overall dimensions of the pouch 20 are selected so that it can be comfortably received in a human oral cavity. Typically, the pouch 20 is sized so as to comfortably fit between the consumer's cheek and gum in the jaw area. By way of example, and without imitation, the major dimension of the pouch 20 may be in the range of about 0.6 to about 1.2 inches while the transverse dimension of the pouch may be in the range of about 0.35 to about 0.75 inches. With such dimensions, the pouch 20 can be comfortably positioned in the oral cavity, on the tongue. Where the pouch 20 is designed to be retained between the cheek and the gums of the oral cavity, the proportions of the pouch may be smaller. With dimensions in the ranges set out above, the pouch 20 can be retained in the oral cavity without any substantial interference with speech or breathing. Such a pouch 20 can also be maneuvered or manipulated by the tongue to move the pouch around in the oral cavity.

In the illustrated embodiment, the pouch 20 is shaped generally like a segment of a circle with rounded or filleted corners. Preferably, the pouch 20 is substantially free of oral cavity irritant, which, as used herein, means that the shape, configuration, and position of the pouch 20 do not irritate oral tissues (e.g, gums). Furthermore, "substantial" and "substantially free" as used in connection with oral cavity irritant mean that the shape, configuration, and position of the pouch 20 does not irritate oral tissues (e.g, gums) in a time frame having the same order of magnitude as a typical length of time during which the pouch 20 is enjoyed by a user. Generally, sharp corners are preferably avoided as sharp corners may lead to oral discomfort. In addition to sharp corners, sealed edge potions (seams) along the consumer's gum base may lead to oral discomfort. Accordingly, when inserted into the mouth and aligned to the consumer's gum base, the presently disclosed pouch 20 that is substantially free of oral cavity irritant does not have any sealed edge potion or sharp corner along the consumer's gum base. While the illustrated embodiment of the pouch 20 is generally a circular segment, many other configurations are within the contemplation of this disclosure. For example, other shapes may also be selected for the pouch 20 including, for example, elliptical, oblong, polygonal with rounded corners or without rounded corners when the number of sides is sufficiently large that the non-rounded corners do not create a substantial irritant.

The pouch 20 preferably includes a cover material 22 that is suitable for oral use and which is not soluble in saliva. More particularly, it is preferred that the cover material 22 of the pouch 20 maintain sufficient structural integrity during the time period that the pouch 20 is used that the cover material 22 will retain flavorant carrier material contained therein. The cover material 22 may be fabricated from natural material, synthetic material, or a combination of natural and synthetic materials. Preferably, the cover material 22 is selected so as to be tasteless and may comprise a woven or non-woven web. Nevertheless, it is further contemplated that the cover material 22 may interact with the flavorant and/or its carrier in the presence of saliva to generate a more complex flavor.

Where the pouch 20 has a crescent shape, the cover material 22 may be folded on itself so that it has an integral edge portion 24 and overlapping edge portions 26. The overlapping edge portions 26 are sealed together. Preferably, that sealing function is accomplished by an adhesive or by mutual sealing the overlapping edge portions 26. Such mutual sealing may be thermal or sonic. Where the pouch 20 has a different external contour, the cover material 22 for the pouch 20 may be in two overlapping pieces. If desired, the crescent-shaped pouch 20 may also be fabricated from two overlapping pieces. Where overlapping pieces are used, the peripheral edge portions of the pieces are preferably sealed together, as described above.

While pouches have traditionally used cellulose fiber as the cover material, e.g., tea bags, alternative pouch materials may also be advantageously used as the covering material disclosed herein. Alternative cover materials with a neutral or pleasant taste or odor preferably have the properties of stain resistance, color, water permeability and/or porosity, and/or water insolubility.

Additionally, the cover materials used for the pouch materials can be provided with predetermined levels for basis weight and/or wet strength to minimize breakage of the pouch cover material during storage and use. For example, pouch cover materials may have a basis weight of about 5 to about 25 grams/square meter ($g/m^2$), such as 5-10,10-15, 15-20, or 20-25 $g/m^2$ and/or a wet tensile cross-direction (CD) strength of about 15 to about 75 N/m (Newtons/meter), such as 15-30, 30-45, 45-60, or 60-75 N/m. The basis weight and/or tensile strength are preferably sufficient for maintaining integrity of the pouch 20 so that any internal material will be retained therein. One exemplary pouch cover material has a basis weight of about 16.5 $g/m^2$ and a wet tensile CD strength of 68 N/m.

In an exemplary embodiment, a water-permeable, water-insoluble, porous, stain-resistant polymer membrane can be used as the pouch cover material to allow flavor from a barrier material to permeate through the pouch cover material thereby minimizing absorption or trapping of the flavor within the pouch cover material. If desired, a pouch cover material 22 may include a coating of a barrier material to minimize staining of the pouch material by its contents. Preferred characteristics of the covering material 22 include controlled permeability and high mouth comfort. These characteristics are available from non-woven polypropylene fabrics which is preferred for material 22.

Regardless of the external contour of the pouch 20, the integral and/or overlapping edge portions define an internal cavity enclosed by the cover material 22 sized to receive a carrier for the flavorant. In one embodiment (see FIG. 2), the carrier 30 may be a substantially solid material such as a dissolvable film that is contained within the cover material 22. The flavorant itself may be a surface treatment of the carrier 30, a mixture with the material of the carrier, or a combination of such a mixture and a surface treatment. For such an embodiment, the flavorant itself may be selected from the group consisting of tea, rose hips, honey, royal jelly, fruit extracts, vitamins, coffee, fruits, mint, vegetables, sweeteners, international flavors, exotic flavors, and ethnic flavors. Other flavors are also within the contemplation of this disclosure, whether natural, synthetic, or a combination of natural and synthetic. Moreover, flavors can be combined as may be desired, e.g., coffee-mint, pomegranate-kiwi. The flavor or combination of flavors is selected to enhance consumer sensorial enjoyment of the product.

The carrier 30 may completely fill the chamber defined by the cover material 22. Alternatively, there may be substantial empty volume in the pouch 20 and around the carrier 30.

Preferred materials for the carrier 30 include polymeric matrices, or materials with very high viscosity (i.e., having a carmel-like or taffy-like consistency). If desired, the carrier 30 may comprise one or more pieces of dried fruit. Generally, however, the flavorant is infused within or inherently part of the carrier to provide a long-lasting flavor experience. The carrier 30 may also be soluble so that it dissolves in saliva over time and passes through the porous covering material 22 into the oral cavity along with the flavorant.

Another embodiment of the carrier 32 (see FIG. 3) comprises a granular or powder material. Again, the granular or powder material may comprise a polymeric matrix, or substantially solid material where the flavorant is (i) a surface coating, (ii) incorporated in the material particles, or (iii) mixed with the carrier material particles.

Another embodiment of the carrier 34 (see FIG. 4) comprises a plurality of beads. Each bead 34 may be generally spherical or irregularly shaped. Moreover, each bead 34 may be fabricated (i) from the flavorant material, (ii) from a matrix incorporating the flavorant, (iii) with the flavorant as a surface coating, or (iv) a combination of two or more of those features. To increase the time duration of flavor release, one or more of the beads 34 may be encapsulated is a soluble coating which impedes flavor release from some of the beads 34 while other beads are active in flavor release. Thus, encapsulation of all or some of the beads 34 promotes flavor release over a substantially extended time period.

As with the carrier 30 of the first embodiment, the flavorant used with the carriers 32, 34 of this embodiment may be selected from the group consisting of tea, rose hips, honey, royal jelly, fruit extracts, vitamins, coffee, fruits, mint, vegetables sweeteners, exotic flavors, and ethnic flavors. Other flavors are also within the contemplation of this disclosure, whether natural, synthetic, or a combination of natural and synthetic. Moreover, flavors can be combined as may be desired, e.g., coffee-mint, pomegranate-kiwi. The flavor or combination of flavors is selected to enhance consumer sensorial enjoyment of the product. Furthermore, this disclosure contemplates that the pouch 20 may include two or more flavorants so that compound flavors may be generated.

From the foregoing, it will be observed that a method of flavor delivery to an oral cavity results from the fabrication and use of the pouch 20 according to this disclosure. As an initial step, a desired flavorant is combined with a carrier. That combination step may include the mixing of two or more flavor compounds together to obtain the desired taste. The flavor compounds may be naturally occurring, or synthetic, or a combination of both. Where a solid carrier is used, that carrier 30 (see FIG. 2) may be coated with the flavorant, or fabricated with the flavorant as an internal component. Where a particulate carrier is used, that carrier 32 may also be mixed with a particulate flavorant. Or, the flavorant can be incorporated into the carrier material followed by comminution to the desired particulate size. Combinations of mixture and incorporation are also acceptable. For beads (see FIG. 4) the beads 34 may be fabricated entirely from the flavorant, or may be fabricated as a mixture of a carrier and the flavorant. To enhance the duration of flavor release, some or all of the beads 34 or particles 32 may be encapsulated. The encapsulation compound is preferably soluble in saliva so that as the encapsulation coating dissolves, additional flavorant is released.

Figure 5:
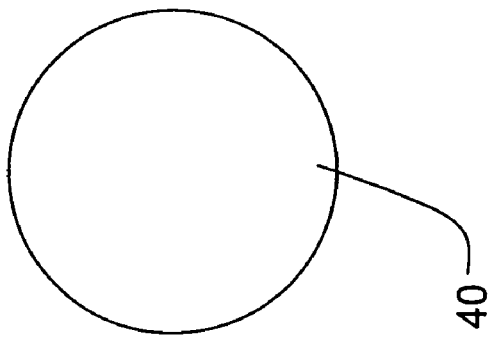
FIG. 5 is a plan view of a blank for making the flavor pouch.

With the flavorant having been combined with a carrier, the carrier may be placed or deposited on a blank 40 (see FIG. 5) which may be circular as shown. The blank 40 is a piece of porous covering material 22 described more particularly above. Preferably, the material of the blank 40 is substantially tasteless and may comprise a membrane.

Figure 6:
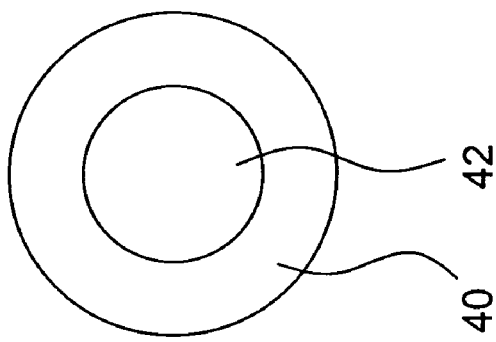
FIG. 6 is a plan view of the blank with a filling in place.

Next (see FIG. 6), the flavorant and carrier material 42 may be deposited on the blank 40 such that the flavorant and carrier material 42 are spaced inwardly away from the perimeter of the blank 40.

Figure 7:
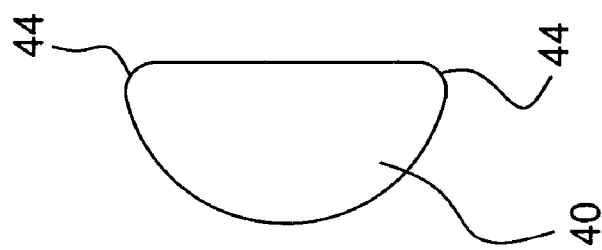
FIG. 7 is a plan view of the folded blank.

Depending on the desired external contour of the finished piece, a second blank may be placed on top of the first blank 40 and the carrier material 42. In the presently preferred arrangement, one part of the first blank 40 is folded over the carrier material and the other part of the blank 40 so as to define a substantially crescent-shaped article (see FIG. 7). Peripheral edge portions of the blank 40 may then be sealed to one another (see FIG. 8). Sealing may be accomplished by applying an edible adhesive, or by bonding peripheral portions of the blank 40 together. Such bonding may be a form of mutual sealing 46, e.g., thermal or sonic, if desired. Preferably, the overlapping parts of the blank 40 are trimmed along the folded edge so as to provide rounded corners 44, thereby effectively eliminating any sharp corners.

Turning now to FIG. 9, a preferred process for manufacture of the flavor pouch is schematically shown. A suitable roll 50 of non-woven polypropylene material, as described above, may be arranged to supply a suitable sheet material as the carrier for the process. The non-woven polypropylene material is dispensed in a substantially planar continuous web 52 which advances to a first, or web-configuring, station 54. Preferably, the web 52 has a transverse dimension which exceeds twice the transverse dimension of the resulting flavor pouch. Where the flavor pouch is crescent-shaped, the transverse dimension of the web 52 may also exceed the longitudinal dimension of the resulting flavor pouch. At the first station 54, suitable folding guides may be provided to reshape the web 52 from a generally planar configuration as it leaves the roll 50 to a substantially V-shaped or U-shaped configuration as it leaves the first station 52. The V-shaped or U-shaped configuration would be seen in a transverse cross-section of the web 52.

The reconfigured web 52 may then be advanced from the first station 54 to a second, or filling, station 58. As the web 52 moves through the second station 58, a filling head 60 deposits a metered quantity of filling material 62 into the fold of the web 52 which is formed at the bottom of the web as seen in FIG. 9.

With the filling 62 in place, the web 52 may advance from the second station 58 to a third, or sealing, station 64. In the sealing station 64, a suitable thermal sealing device is actuated transversely of the web 52. The thermal sealing device includes an arcuate iron (heater) which engages one side of the web 52, surrounding the deposited filling material 62. The arcuate iron then presses the first side of the web 52 against the second side of the web 52, and against a second, opposed iron or non-heated surface. The effect of heat and pressure from the opposed irons effects a substantially continuous seal 66 surrounding the filling 62 and extending around the filling 62 from the web fold on one side of the filling 62 to the web fold on the other side of the filling 62. Accordingly, the filling 62 may be entirely enclosed in the web material 52 by the seal 66.

After the filling 62 has been sealed in the web 52, the web advances from the third station 64 to a fourth, or severing, station 68. In the fourth station 68, a suitable severing device separates the finished flavor pouch from the web 52. The severing step 68 can be effected by cutting the pouch from the web 52 along the cut line 70. Such severing can be accomplished in any of several ways. For example, a punch and die can be used. Alternatively, a thermal element can be used to melt the polypropylene material along the cut line 70 to accomplish separation. Other severing devices known to those skilled in the art can also be used.

As the web 52 emerges from the severing station 68, the waste portion 74 of the web 52 is preferably collected. That waste portion 74 can be recycled to make efficient use of the roll material 50.

As the web 52 sequentially moves through the stations 54, 58, 64, 68, the web 52 may be intermittently advanced, as desired. Alternatively, the web can move continuously through the stations. In the latter situation, the filling head 60, sealing head, and severing apparatus may be arranged to move in the direction of the web 52 to synchronize the respective positions with the filling 62 deposited in the folded web 52.

With the carrier thus enclosed in the covering material, the flavor pouch assembly is ready for distribution and, ultimately, use. In use, the assembly is placed in the consumer's mouth or oral cavity. If placed on the tongue, saliva contacts the carrier and flavorant through the covering material 22 thus releasing the flavor into the oral cavity. The flavorants typically stimulate production of additional saliva in the mouth so that continuing saliva contact and flavorant release occurs.

Flavorant release may also result from mastication of the carrier between the consumer's teeth. In such a situation, the flavorant release is accomplished by occasional chewing of the pouch assembly. Extended-time flavor release is then accomplished by occasional chewing to release additional flavor.

Where the flavorant is in bead form, the flavorant may comprise a liquid contained in one or more rupturable beads. In use, mastication of the pouch 20 will release flavorant on demand. Alternatively, continued exposure to saliva may dissolve the beads thereby exposing the flavorant. Furthermore, encapsulated beads provide randomly delayed release of flavorant from corresponding beads so that flavor release occurs over a relatively extended duration of time.

The pouch 20 of this disclosure has a distinctive, neat, and attractive appearance. Moreover, the pouch 20 is sized so as to be self-aligning to the gum base when inserted into the mouth. Furthermore, the absence of orally irritating corners and edges improves the mouth comfort or feel of the resulting pouch 20.

Where the term "about" is used in this specification as a modifier for a specific number, that term is intended to include not only the specific number but also a tolerance for that number of +/−10%.

The pouch assembly of a flavorant and carrier in a tasteless, porous covering provides a new delivery system for flavorants to adults. It will also be apparent to those skilled in the art that numerous modifications, variations, substitutions, and equivalents exist for features of the invention that do not materially depart from the spirit and scope of the invention. Accordingly, it is expressly intended that all such modifications, variations, substitutions, and equivalents which fall within the spirit and scope of the appended claims be embraced thereby.

What is claimed is:

1. A method of making flavor pouches comprising the steps of:
   feeding a non-woven strip along a generally horizontal feed path, the strip having a combination of natural and synthetic material with a basis weight of 5 to 25 g/m², being a water-permeable, water-insoluble stain resistant polymer membrane that is insoluble in saliva, having structural integrity sufficient to retain a flavor carrier material when used in a human oral cavity, having a coating of barrier material which minimizes staining of one surface, and having a dissolvable film on the other surface;
   forming the strip into an upwardly open U-shaped or V-shaped configuration such that the dissolvable film is within the U-shaped or V-shaped configuration;
   placing preselected amounts of flavorant material at spaced apart locations along the formed strip on the surface having the dissolvable film, within the shaped configuration, the flavorant material being a solid material having a flavorant as a surface coating or incorporated in the material;
   forming flavor pouches sized for placement in a human oral cavity by sealing portions of the strip together with a continuous arcuate seal having one or more corners to enclose each preselected amount of flavorant material by thermally welding overlapping regions of the strip;
   separating the flavor pouches from a waste portion of the strip wherein the separating comprises punching the flavor pouches out of remaining portions of the strip; and
   trimming overlapping portions of the strip to provide rounded corners.

2. The method of claim 1, wherein the strip is non-woven polypropylene and the forming creates a pouch substantially free of oral irritants.

3. The method of claim 1, wherein the placing comprises depositing on the strip a flavorant selected from the group consisting of tea, rose hips, honey, royal jelly, fruit extract, coffee, mint or mixture thereof.

4. The method of claim 1, wherein the major dimension of each pouch is about 0.6 to 1.2 inches.

5. The method of claim 1, wherein the flavorant comprises surface coated beads wherein the surface coating is soluble to effect timed release of the flavorant.

6. The method of claim 1, further comprising folding the strip into a U-shaped or V-shaped strip while feeding the strip along the feed path and wherein the placing step includes placing preselected amounts of flavorant material at spaced apart locations along the U-shaped or V-shaped strip.

7. The method of claim 6, wherein the sealing includes forming an arcuate weld seam and the separating comprises severing the strip along the arcuate weld seam.

8. A method of making flavor pouches comprising the steps of:
   feeding a non-woven strip along a generally horizontal feed path, the strip having a combination of natural and synthetic material with a basis weight of 5 to 25 q/m², being a water-permeable, water-insoluble stain resistant polymer membrane that is insoluble in saliva, having structural integrity sufficient to retain a flavor carrier material when used in a human oral cavity, having a coating of barrier material which minimizes staining of one surface, and having a dissolvable film on the other surface;
   forming the strip into an upwardly open U-shaped or V-shaped configuration such that the dissolvable film is within the U-shaped or V-shaped configuration;
   placing preselected amounts of flavorant material at spaced apart locations along the formed strip on the surface having the dissolvable film, within the shaped configuration, the flavorant material being a solid material having a flavorant as a surface coating or incorporated in the material;
   forming rounded flavor pouches sized for placement in a human oral cavity by sealing portions of the strip together with a continuous arcuate seal having one or more corners to enclose each preselected amount of flavorant material by thermally welding overlapping regions of the strip;
   separating the rounded flavor pouches from the strip wherein the separating comprises punching the flavor pouches out of remaining portions of the strip; and
   trimming overlapping portions of the strip to provide rounded corners.

9. The method of claim 8, wherein the web is non-woven polypropylene.

10. The method of claim 8, wherein the placing comprises depositing on the strip a flavorant selected from the group consisting of tea, rose hips, honey, royal jelly, fruit extract, coffee, mint or mixture thereof.

11. The method of claim 8, wherein the major dimension of each pouch is about 0.6 to 1.2 inches.

12. The method of claim 8, wherein the flavorant comprises surface coated beads wherein the surface coating is soluble to effect timed release of the flavorant.

13. The method of claim 8, further comprising folding the strip into a U-shaped or V-shaped strip while feeding the strip along the feed path and wherein the placing step includes placing preselected amounts of flavorant material at spaced apart locations along the U-shaped or V-shaped strip.

14. The method of claim 13, wherein the sealing includes forming an arcuate weld seam and the separating comprises severing the strip along the arcuate weld seam.

* * * * *